United States Patent [19]

Matsufuji et al.

[11] Patent Number: 4,839,225

[45] Date of Patent: Jun. 13, 1989

[54] MAGNETIC RECORDING MEDIUM

[75] Inventors: Akihiro Matsufuji; Shigeo Komine, both of Kanagawa, Japan

[73] Assignee: Fuji Photo Film Co., Ltd., Kanawaga, Japan

[21] Appl. No.: 38,171

[22] Filed: Apr. 14, 1987

[30] Foreign Application Priority Data

Apr. 14, 1986 [JP] Japan ................................. 61-84273

[51] Int. Cl.$^4$ ............................................... G11B 5/70
[52] U.S. Cl. .................................... 428/336; 428/420; 428/425.9; 428/694; 428/900
[58] Field of Search ............ 428/694, 695, 420, 425.9, 428/900

[56] References Cited

U.S. PATENT DOCUMENTS

| | | | |
|---|---|---|---|
| 4,328,281 | 5/1982 | Wrightson | 428/420 |
| 4,487,802 | 12/1984 | Miyoshi | 428/523 |
| 4,504,542 | 3/1985 | Miyoshi | 428/692 |
| 4,528,240 | 7/1985 | Miyoshi | 428/323 |
| 4,617,226 | 10/1986 | Yamaguchi | 428/323 |
| 4,666,769 | 5/1987 | Miyata | 428/694 |
| 4,671,995 | 6/1987 | Sekiya | 428/694 |

*Primary Examiner*—Paul J. Thibodeau
*Attorney, Agent, or Firm*—Sughrue, Mion, Zinn, Macpeak and Seas

[57] ABSTRACT

A magnetic recording medium is described, comprising a non-magnetic support having provided thereon, in sequence, an intermediate layer and a magnetic layer coated with a dispersion of ferromagnetic particles in a binder, wherein said intermediate layer contains at least one binder containing at least one of a hydroxyl group and an amino group, and said magnetic layer contains an isocyanate compound.

12 Claims, No Drawings

MAGNETIC RECORDING MEDIUM

FIELD OF THE INVENTION

The present invention relates to a magnetic recording medium, and more particularly it relates to a magnetic recording medium having no problem as to shedding powder and having improved running durability.

BACKGROUND OF THE INVENTION

In the past, as a magnetic recording medium for audio recording, video recording, and data recording, a magnetic recording medium which is prepared by coating on a non-magnetic support a magnetic coating composition which is obtained by dispersing ferromagnetic particles such as ferromagnetic iron oxide, cobalt-containing iron oxide, chrominum dioxide, ferromagnetic metal particles, etc., into a binder has been widely used.

As a non-magnetic support is mainly used a plastic film such as polyethylene terephalate having high mechanical strength and having excellent solvent resistance. However, a magnetic layer generally has low mechanical strength and poor adhesion to the above-described support, whereby the magnetic layer gradually comes off the support in many cases while the tape is running. In order to overcome this problem, an intermediate layer (or an undercoat layer) is provided between a support and a magnetic layer, as described in U.S. Pat. Nos. 4,504,542 and 4,487,802. Additionally, in order to prevent static electrical charging, addition of carbon black into the intermediate layer has been described in U.S. Pat. Nos. 4,528,240 and 4,617,226.

Polyester is generally used as a binder for the above intermediate layer, but is not satisfactory to provide sufficient adhesive property to the magnetic layer, particularly to a magnetic layer prepared with ferromagnetic metal fine particles. Therefore, when running is repeated, the magnetic layer happens to come off (referred to as powder shedding), resulting in causing an increase of dropouts and clogging of the head gap.

SUMMARY OF THE INVENTION

Accordingly, an object of the present invention is to provide a magnetic recording medium wherein powder shedding of a magnetic layer is prevented and the intermediate layer provides remarkably improved adhesion between the magnetic layer and the support.

As a result of thorough investigation to overcome the above-described defects of the prior art, the inventors of the present invention have found that adhesive strength between an intermediate layer and a magnetic layer can be remarkably improved, resulting in preventing a magnetic layer from coming off by incorporating an isocyanate compound (i.e., a compound containing one or more isocyanate groups) into a magnetic layer so that a binder contained in an intermediate layer is chemically bonded with the isocyanate compound contained in the magnetic layer and have attained the present invention.

That is, the present invention relates to a magnetic recording medium comprising a non-magnetic support having provided thereon, in sequence, an intermediate layer and a magnetic layer coated with a dispersion of ferromagnetic particles in a binder, wherein the said intermediate layer contains at least one binder containing at least one of a hydroxyl group and an amino group and the said magnetic layer contains an isocyanate compound.

DETAILED DESCRIPTION OF THE INVENTION

The present invention is hereinafter described in more detail.

The non-magnetic supports used in the present invention include various synthetic resin films such as polyethylene terephthalate (PET), polypropylene, polycarbonate, polyethylene naphthalate, polyamide, polyamidoimide, polyimide, or so on. The thickness of the supports is generally from 3 to 50 microns, more preferably from 5 to 30 microns.

Hydroxyl group-containing binders used for the intermediate layer of the present invention include a homo- or copolymer of a hydroxyethyl(meth)acrylate, a polyvinyl acetal resin, a polyvinyl butyral resin, an epoxy resin, a phenoxy resin, a hydroxyl group-containing polyurethane resin, a hydroxyl group-containing polyester resin, etc., and the amino group-containing binders include an ethylene imine resin, a homo- or copolymer of N-methylaminoethyl(meth)acrylate, and the like. In the above copolymers, vinyl alcohol, vinyl esters such as vinyl acetate, vinyl propionate, etc., and a monomer containing unsaturated double bond such as (meth)acrylate (e.g., methyl acrylate) can be included as a comonomer.

The intermediate layer of the present invention can be comprised of only one or more of the above binders and can be added with conventionally used binders such as polyesters, polyurethanes, copolymers of butadiene and acrylonitrile, copolymers of vinylidene chloride and acrylonitrile, etc. When other binders are used in combination in an intermediate layer, it is preferred that the binder containing a hydroxyl group and/or an amino group is used in an amount of 10 wt. % or more, and more preferably 30 wt. % or more, based on the total weight of binder in the intermediate layer.

Additives such as carbon black, etc., can be incorporated into the intermediate layer of the present invention to prevent static electrical charging.

For providing the intermediate layer, the above-described binder or binder mixture is mixed and kneaded with a solvent, with carbon black and/or with other additives, if desired, and is coated on a support, followed by drying.

Organic solvents used for the coating operation include ketones such as acetone, methyl ethyl ketone, methyl isobutyl ketone or cyclohexanone; alcohols such as methanol, ethanol, propanol, or butanol; esters such as methyl acetate, ethyl acetate, butyl acetate, ethyl lactate or monoethyl ether of glycol acetate; glycol ethers such as ether, glycol dimethyl ether, glycol monoethyl ether or dioxane; tars (aromatic hydrocarbons) such as benzene, toluene or xylene; and chlorinated hydrocarbons such as methylene chloride, ethylene chloride, carbon tetrachloride, chloroform, ethylene chlorohydrin, or dichlorobenzene.

The dry thickness of the intermediate layer is generally from 0.05 to 5 microns, and preferably from 0.1 to 1 micron.

The ferromagnetic particles used in the present invention include conventionally used iron oxide type ferromagnetic particles ($\gamma$-$Fe_2O_3$, $Fe_3O_4$, etc.), Co-containing iron oxide type ferromagnetic particles, chrominum oxide type ferromagnetic particles, and ferromagnetic metal particles. Ferromagnetic metal fine particles having a specific surface area (BET) of 42 m²/g or more are preferably used in the present invention. Normally such fine particles of ferromagnetic metal particles cause poor adhesion between a magnetic layer and a support via a conventional intermediate layer, although such fine particles are suitable for high density recording and can provide excellent reproduced output. On the other hand, by providing the intermediate layer of the present invention, a magnetic recording medium suitable for high density recording and having high reproduced output without being accompanied with the problems such as powder shedding can be obtained.

Ferromagnetic metal particles can be composed of iron or an alloy such as Fe, Fe-Ni, or Fe-Ni-Co, and can be prepared, for example, by the following methods, (1) A method which comprises heat-decomposing an organic acid salt of the ferromagnetic metal particles and reducing it with a reducing gas.

(2) A method of reducing acicular oxyhydroxides, metal-containing oxyhydroxides or acicular iron oxides obtained from the oxyhydroxides.

(3) A method of evaporating ferromagnetic metal in an inactive gas under a low pressure.

(4) A method of heat-decomposing a metal carbonyl compound.

(5) A method which comprises electrodepositing ferromagnetic metal particles using a mercury cathode and then separating the particles from the mercury.

(6) A method of reducing metal salts which form ferromagnetic particles in an aqueous solution with a reducing substance such as a boron hydride compound, a hypophosphite, or a hydrazine.

In the present invention, ferromagnetic metal particles prepared in accordance with the above-described methods (2), (3), and (6) are easy to use, and more particularly, particles prepared in accordance with method (2) are the most preferred in view of low cost and high quality. Upon preparing ferromagnetic metal particles for use in the present invention, an oxide layer is formed on the surface of particles to improve the chemical stability of the metal particles.

The oxide layer is formed on the surface of particles by a conventional oxidation treatment as described, for example, in U.S. Pat. Nos. 4,554,086, 4,608,093 and 3,634,063, after ferromagnetic metal particles are prepared by the above-described various methods. There are various gradual oxidation treatments, for example, a method of gradually introducing oxidizing gas into a furnace immediately after reduction, a method of dipping thus formed metal particles in an organic solvent and then introducing air thereinto for oxidation, etc., and as a result, the characteristics of the ferromagnetic metal particles can be stabilized.

Ferromagnetic metal particles can further contain non-magnetic or non-metallic elements such as B, C, N, Al, Si, P, S, Ti, Cr, Mn, Cu, Zn, etc., in a slight amount.

The specific surface area of ferromagnetic metal particles is the value measured by the BET method using $N_2$ gas. The specific surface area of ferromagnetic metal particles of the present invention having extremely small particle size is at least 42 m²/g or more, and more preferably 45 m²/g or more. When the specific surface area becomes smaller, sufficient video characteristics cannot be obtained, resulting in increasing noise and decreasing SN ratio.

When the specific surface area becomes much larger, it happens in many cases that saturation magnetization ($\delta_s$) decreases and that magnetic characteristics deteriorate by oxidation. Therefore, the specific surface area is preferably from 42 m²/g to 100 m²/g, and more preferably from 45 m²/g to 90 m²/g, measured by the BET method.

In the present invention, an isocyanate compound is incorporated together with a binder in a magnetic layer. The isocyanate compounds to be used are a reaction product of diisocyanate (3 moles) such as tolylene diisocyanate, xylylene diisocyanate, hexamethylene diisocyanate, isophoron diisocyanate, diphenyl methane diisocyanate,

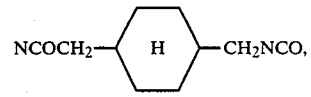

etc., with trimethylol propane (1 mol), and isocyanurate derivatives of the abovedescribed diisocyanate.

The additive amount of isocyanate compound is preferably from 10 wt. % to 60 wt. %, and more preferably from 20 wt. % to 40 wt. %, bases on the total weight of binder in the magnetic layer.

The binders used for forming a magnetic layer of the present invention include conventionally used thermoplastic resins, thermosetting resins and reactive type resins, which can be used alone or in combination.

The thermoplastic resins having generally an average molecular weight of from 10,000 to 200,000 and having a degree of polymerization of from about 200 to 2,000 are used. Examples of such thermoplastic resins include a copolymer of vinyl chloride and vinyl acetate, a copolymer of vinyl chloride and vinylidene chloride, an acryl resin, a cellulose derivative, various synthetic rubber type thermoplastic resins, urethane elastomer, polyvinyl fluoride, a polyamide resin, polyvinyl butyrate, a copolymer of styrene and butadiene, and a polystyrene resin. These can be used alone or in combination.

The thermosetting resins or reactive type resins used in the present invention are those resins having an average molecular weight of 200,000 or less when used in a coating composition, and having an infinite number average molecular weight due to condensation reaction or addition reaction after they are coated. In this case, when these resins are thermosetting resins, those resins which do not soften nor melt by heating until those resins are hardened are preferred. Examples of such resins are a phenol and formalin-novolac resin, a phenol and formalin-resol resin, a phenol and furfural resin, a xylene and formaldehyde resin, a urea resin, a melamine resin, a dry oil-modified alkyl resin, a phenol resin-modified alkyd resin, a maleic acid resin-modified alkyl resin, an unsaturated polyester resin, a combination of an epoxy resin and a hardening agent, a terminal isocyanate polyether mositure hardenable resin, a polyisocyanate prepolymer and a combination of polyisocyanate prepolymer and a resin having an active hydrogen. Those resins can be used alone or in combination.

The additive amount of the magnetic layer binder is generally from 10 to 100 parts by weight, and preferably from 15 to 50 parts by weight, per 100 parts by weight of ferromagnetic particles.

Various additives such as lubricating agents, abrasive agents, antistatic agents and the like can further be added to the magnetic layer of the present invention.

A magnetic layer is prepared by mixing the above-described ferromagnetic particles, binders and isocyanate compounds, and other additives, if desired, with a solvent and kneading them, and coating the thus prepared magnetic coating composition on the above-described intermediate layer, which is then subjected to magnetic orientation, dried, and subjected to calendering treatment and heat treatment, and then slit to a desired width.

As a solvent used therein, those solvents used in the intermediate layer can be also used. The method for coating the intermediate layer and the magnetic layer is that conventionally used, and these intermediate layer and magnetic layer can be coated simultaneously.

The heat treatment is generally conducted at a temperature of 40° C. or higher, preferably from 50° to 80° C. for 12 hours or more, preferably from 24 to 100 hours. By this heat treatment, the binder containing the abovedescribed hydroxyl group and/or amino group in the intermediate layer is reacted with the isocyanate compound contained in the magnetic layer to bond chemically, resulting in remarkably improving the adhesion of the layers.

A backing layer containing abrasive agents, carbon black, and the like can be provided, if desired, in the magnetic recording medium of the present invention in order to improve running stability and to prevent static electrical charging.

The present invention is illustrated in more detail by the following Examples. In the Examples, all parts are by weight.

The following formulation for preparing a magnetic layer was used in the Examples.

| Formulation for magnetic coating composition | |
|---|---|
| Ferromagnetic metal fine particles (Fe 94%, Zn 4%, Ni 2%, Hc: 1530 Oe, saturation flux density: 120 emu/g, specific surface area: 52.5 m²/g) | 100 parts |
| Copolymer of vinyl chloride, vinyl acetate and maleic anhydride (prepared by Nippon Zeon Co., Ltd.: 400 × 110A, degree of polymerization: 400) | 12 parts |
| Polyurethane resin ("N-2304", manufactured by Nippon Polyurethane Co., Ltd.) | 5 parts |
| α-Al₂O₃ (average particle size: 0.3 micron) | 10 parts |
| Stearic acid | 2 parts |
| Butyl stearate | 2 parts |
| Carbon black (average particle size: 40 millimicrons) | 2 parts |
| Methyl ethyl ketone | 300 parts |
| Methyl isobutyl ketone | 50 parts |

The above-described composition was introduced in a ball mill and was dispersed for 24 hours and 10 parts of polyisocyanate ("Desmodule L-75", manufactured by Bayer A.G., a 75 wt. % ethyl acetate solution of an adduct product of 3 moles of tolylene diisocyanate and 1 mole of trimethylolpropane) was added thereto and dispersed with high speed shearing force for 1 hour and was filtered with a filter having an average pore diameter of 3 microns to obtain a magnetic coating composition.

EXAMPLES 1 to 3

As a support, a polyethylene terephthalate film having a thickness of 14 microns was used. As a composition for an intermediate layer, polyester ("STAFIX", manufactured by Fuji Photo Film Co., Ltd.) and the binder of the present invention as shown in Table 1 were used in a weight ratio of 7/3 in the intermediate layer (thickness: 0.2 micron) provided, and thereon the above-described magnetic layer was coated in a thickness of 5 microns.

COMPARATIVE EXAMPLE 1

The same procedure as in Examples 1 through 3 was repeated to provide an intermediate layer and a magnetic layer except that only the polyester ("STAFIX", manufactured by Fuji Photo Film Co., Ltd.) was used for preparing an intermediate layer.

The thus obtained samples were evaluated in the following manner and the results are shown in Table 1.

Adhesive Strength

A part of a magnetic tape slit to ½ inch width was adhered to a mat using a dual adhesive tape, and an end of the tape was peeled off with an angle of 180°. The adhesion strength was the strength with which the tape was peeled off.

Powder Shedding (Guide Pole Stain)

Stain on the guide pole of a deck was observed with a microscope.

Increase of Dropouts (DO)

Using a video tape recorder Fujix M6 (manufactured by Fuji Photo Film Co., Ltd), 5 MHz signals were recorded and while these signals were reproduced, the number of dropouts of −16 dB for 5 μsec appearing on a monitor screen was counted for 1 min. The increase of dropouts was the percentage of increase of dropouts, that is, the ratio between the number of dropout counted after first pass and the number of dropouts counted after 100 passes.

TABLE 1

| | Binder | Adhesive Strength | Powder Shedding (Guide Pole Stain) | Increase of DO |
|---|---|---|---|---|
| Example 1 | Vinyl acetate/hydroxyethyl methacrylate 6/4 (mole/mole) | 80 g | none | 10% |
| Example 2 | Vinyl acetate/hydroxyethyl methacrylate 8/2 | 70 g | none | 10% |
| Example 3 | Vinyl acetate/monomethyl-aminoethyl methacrylate 6/4 (mole/mole) | 80 g | none | 10% |

TABLE 1-continued

| | Binder | Adhesive Strength | Powder Shedding (Guide Pole Stain) | Increase of DO |
| --- | --- | --- | --- | --- |
| Comparative Example 1 | Only polyester | 30 g | Slight stain was observed | 100% |

As is clear from the foregoing results, the samples of the present invention exhibit better adhesion than the comparative sample using only polyester in the intermediate layer, and powder shedding and increase of dropouts were substantially prevented in the samples of the present invention.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having provided thereon, in sequence, an intermediate layer and a magneic layer coated with a dispersion of ferromagnetic particles in a binder, wherein said intermediate layer contains at least on binder containing 20 mol% or more of a monomer component having at least one of a hydroxyl group and an amino group per molecule thereof which is available for further reaction with an isocyanate compound, said binder being contained in said intermediate layer in an amount of 10 wt. % or more based on the total weight of binder in said intermediate layer, and said magnetic layer contains an isocyanate compound.

2. A magnetic recording medium as in claim 1, wherein the ferromagnetic particles are ferromagnetic metal particles having a specific surface area of 42 $m^2/g$ or more.

3. A magnetic recording medium as in claim 2, wherein the ferromagnetic particles are ferromagnetic metal particles having a specific surface area of from 42 to 100 $m^2/g$.

4. A magnetic recording medium as in claim 3, wherein the ferromagnetic particles are ferromagnetic metal particles having a specific surface area of from 45 to 90 $m^2/g$.

5. A magnetic recording medium as in claim 1, wherein the dry thickness of the intermediate layer is from 0.05 to 5 microns.

6. A magnetic recording medium as in claim 5, wherein the dry thickness of the intermediate layer is from 0.1 to 1 micron.

7. A magnetic recording medium as in claim 1, wherein the amount of isocyanate compound is from 10 to 60 wt. % based on the total weight of binder in the magnetic layer.

8. A magnetic recording medium as in claim 7, wherein the amount of isocyanate compound is from 20 to 40 wt. % based on the total weight of binder in the magnetic layer.

9. A magnetic recording medium as in claim 1, wherein said magnetic layer contains binder in an amount of from 10 to 100 parts by weight per 100 parts by weight of ferromagnetic particles in said magnetic layer.

10. A magnetic recording medium as in claim 9, wherein said magnetic layer contains binder in an amount of from 15 to 50 parts by weight per 100 parts by weight of ferromagnetic particles in said magnetic layer.

11. A magnetic recording medium as in claim 1, wherein the amount of the binder containing at least one of a hydroxyl group and an amino group is 30 wt. % or more based on the total weight of binder in the intermediate layer.

12. A magnetic recording medium as in claim 8, wherein the amount of the binder containing at least one of a hydroxyl group and an amino group is 30 wt. % or more based on the total weight of binder in the intermediate layer.

* * * * *